Jan. 20, 1931.  E. E. REID  1,789,774
LINE HOLDER
Filed May 26, 1930

Inventor
E. E. Reid
By C A Snow & Co.
Attorneys.

Patented Jan. 20, 1931

1,789,774

UNITED STATES PATENT OFFICE

ERNEST E. REID, OF NICKERSON, KANSAS

LINE HOLDER

Application filed May 26, 1930. Serial No. 455,854.

This invention relates to a device designed for use in connection with agricultural machinery, and more particularly corn husking machines, the primary object of the invention being to provide means for holding the control lines of the tractor or power device pulling the farm machinery, in spaced relation with each other, to facilitate the operation of the machine.

An important object of the invention is to provide a device of this character which may be readily and easily positioned over the end gate of a wagon box with which the husking machine is used, thereby providing a device which may be used in connection with various types of agricultural machinery.

Another object of the invention is to provide a device comprising open rings, the openings of the rings being so arranged that the lines may be readily inserted, but will be securely held against accidental displacement.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
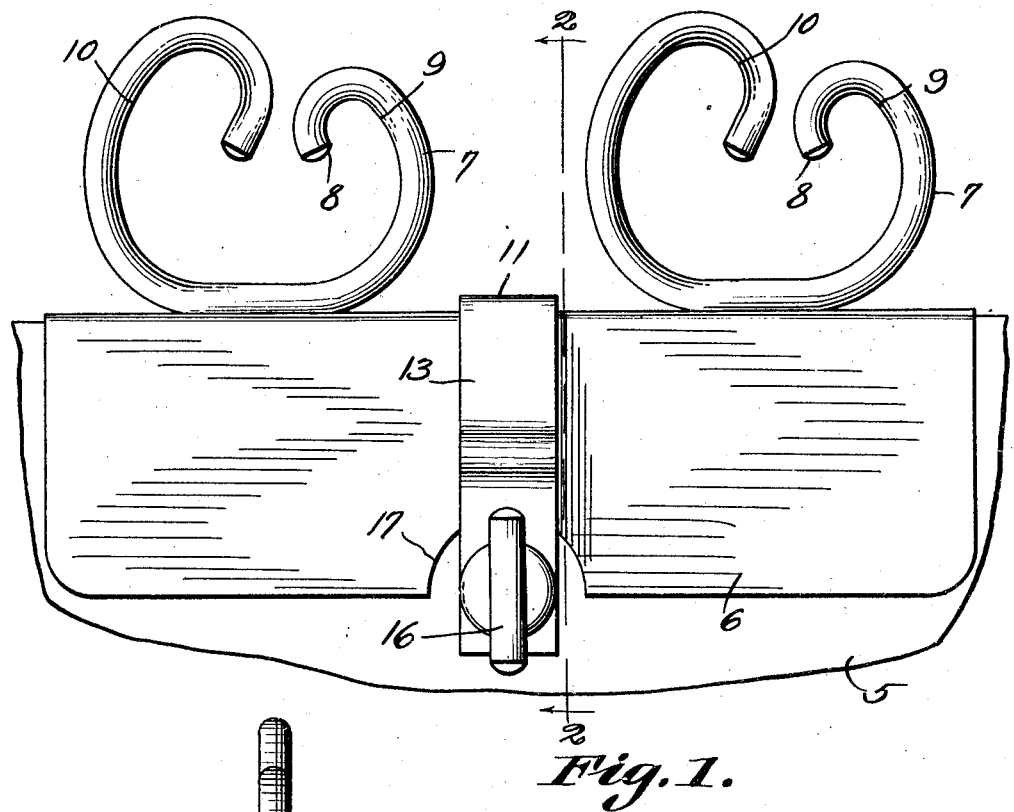
Figure 1 is an elevational view of a line holder constructed in accordance with the invention.

Referring to the drawing in detail, the reference character 5 designates the end gate of a wagon box over which the line holder, forming the subject matter of this invention, is positioned.

The reference character 6 designates the body portion of the device which is constructed preferably of sheet metal and bent to provide opposed sections to fit over a support such as an end gate.

Secured to the body portion, and arranged in spaced relation with each other, are split ring members 7 that have their ends turned inwardly as at 8 and arranged in spaced relation with each other as clearly shown by the drawing, so that the lines may be readily positioned.

Loops 9 and 10 are formed by these ring members, the loops 10 being larger than the loops 9 to the end that the openings through which the lines are passed are disposed near the right hand sides of the rings to insure against the lines being pulled through the openings or spaces, when they are drawn taut.

Figure 2:
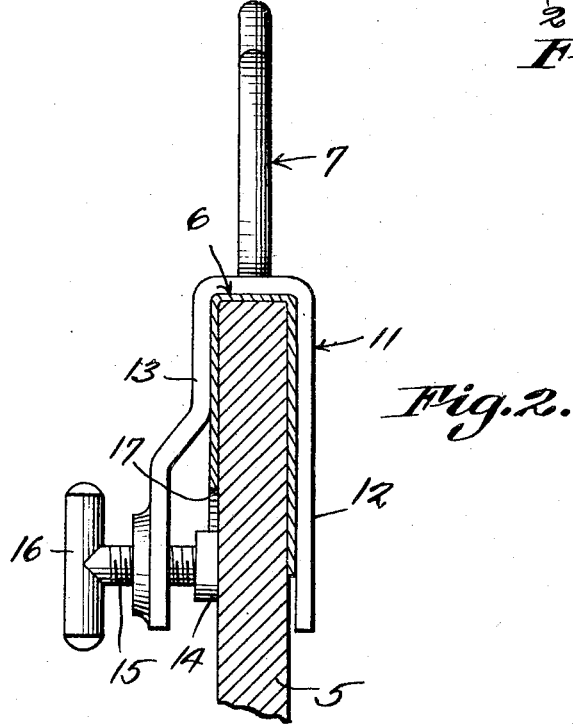
Figure 2 is a sectional view taken on line 2—2 of Figure 1.

The securing device for securing the line holder in position, comprises a clamp indicated generally by the reference character 11, the clamp providing spaced leg members 12 and 13 respectively, the leg member 13 being offset as shown by Figure 2, to provide a clearance for the head 14 at the inner end of the bolt 15. A finger piece 16 is formed on the outer end of the bolt 15 and affords means whereby the bolt may be rotated.

One of the sections of the body portion is provided with a cut out portion 17 disposed in the lower edge thereof, and arranged at a point intermediate the ends, which cut out portion is curved to accommodate the head 14 to permit the head to engage the end gate of the wagon box.

Thus it will be seen that due to this construction the device may be readily and easily removed or replaced, and the lines positioned in the members 7, will be held in proper spaced relation with each other at all times so that the operator may have absolute control over the power device at all times.

I claim:

A line holder comprising a body portion, said body portion comprising a length of sheet metal bent intermediate its side edges to provide opposed sections to be fitted over a supporting structure, one of the sections having a cut out portion disposed intermediate its ends, a clamp positioned over the body portion, a bolt forming a part of the clamp, a head on the bolt, said head being disposed within the cut out portion to clamp the supporting structure, and split ring members mounted on the body portion.

In testimony that I claim the foregoing as my own, I have hereto affixed my signature.

ERNEST E. REID.